L. H. THOMPSON.
TRACKING DEVICE FOR MUSIC SHEETS.
APPLICATION FILED NOV. 12, 1917.
1,324,941.
Patented Dec. 16, 1919.
4 SHEETS—SHEET 1.
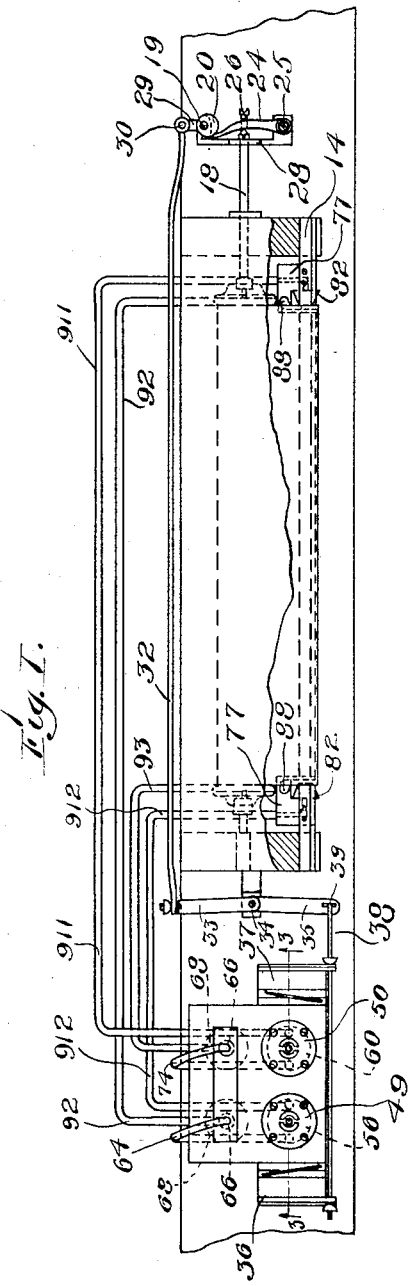
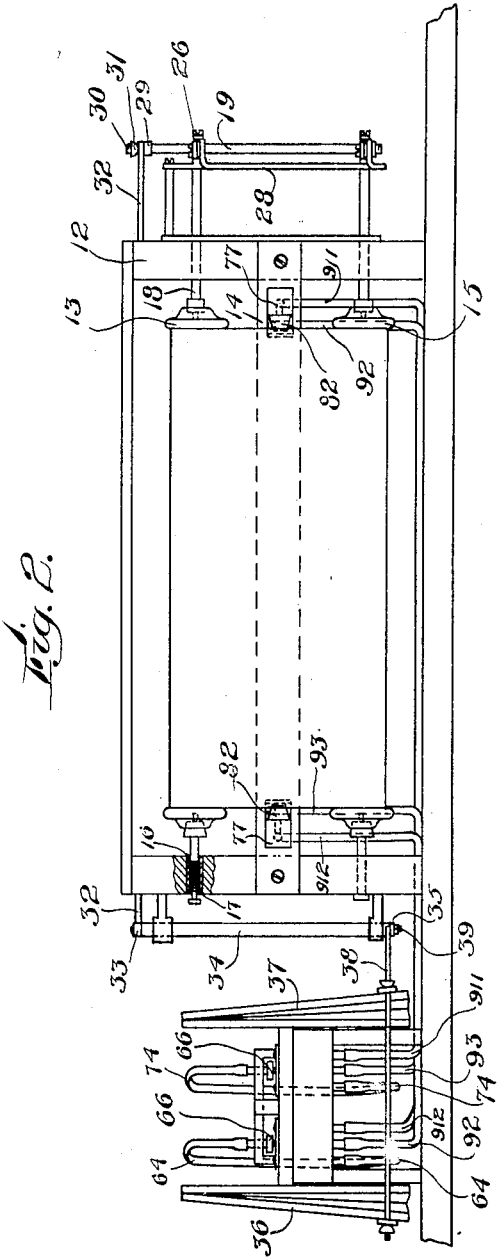
Inventor:
Lester H. Thompson,
by Wright, Brown, Quinby & May
Attorneys.

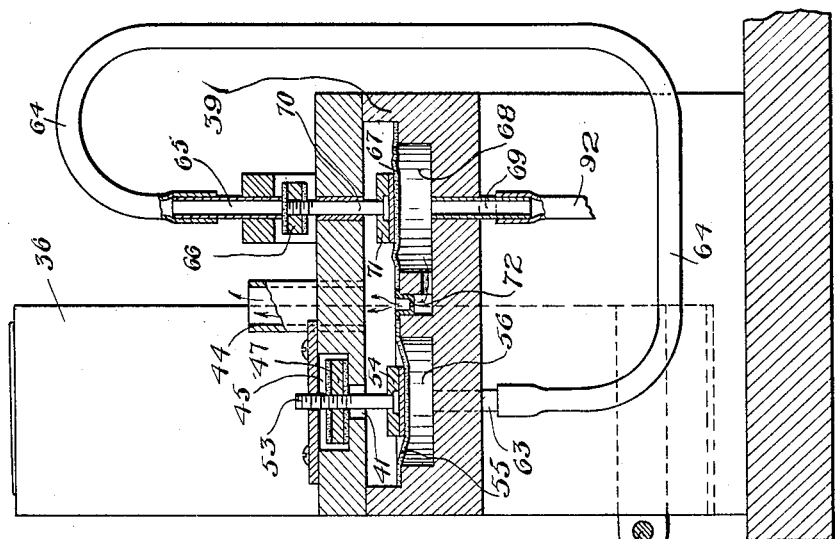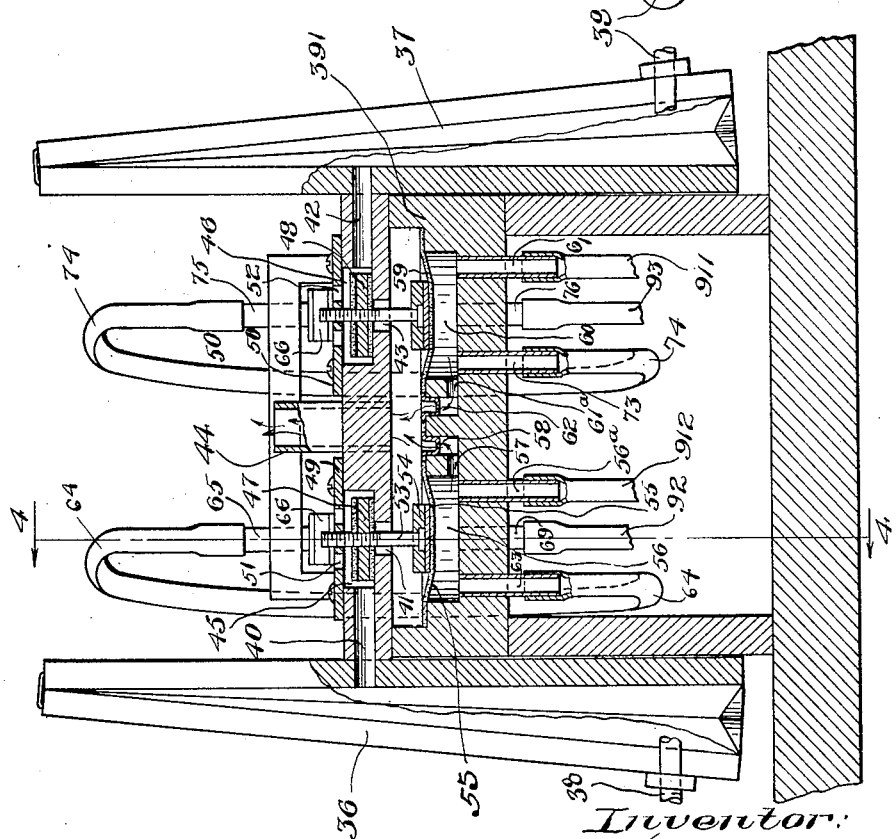

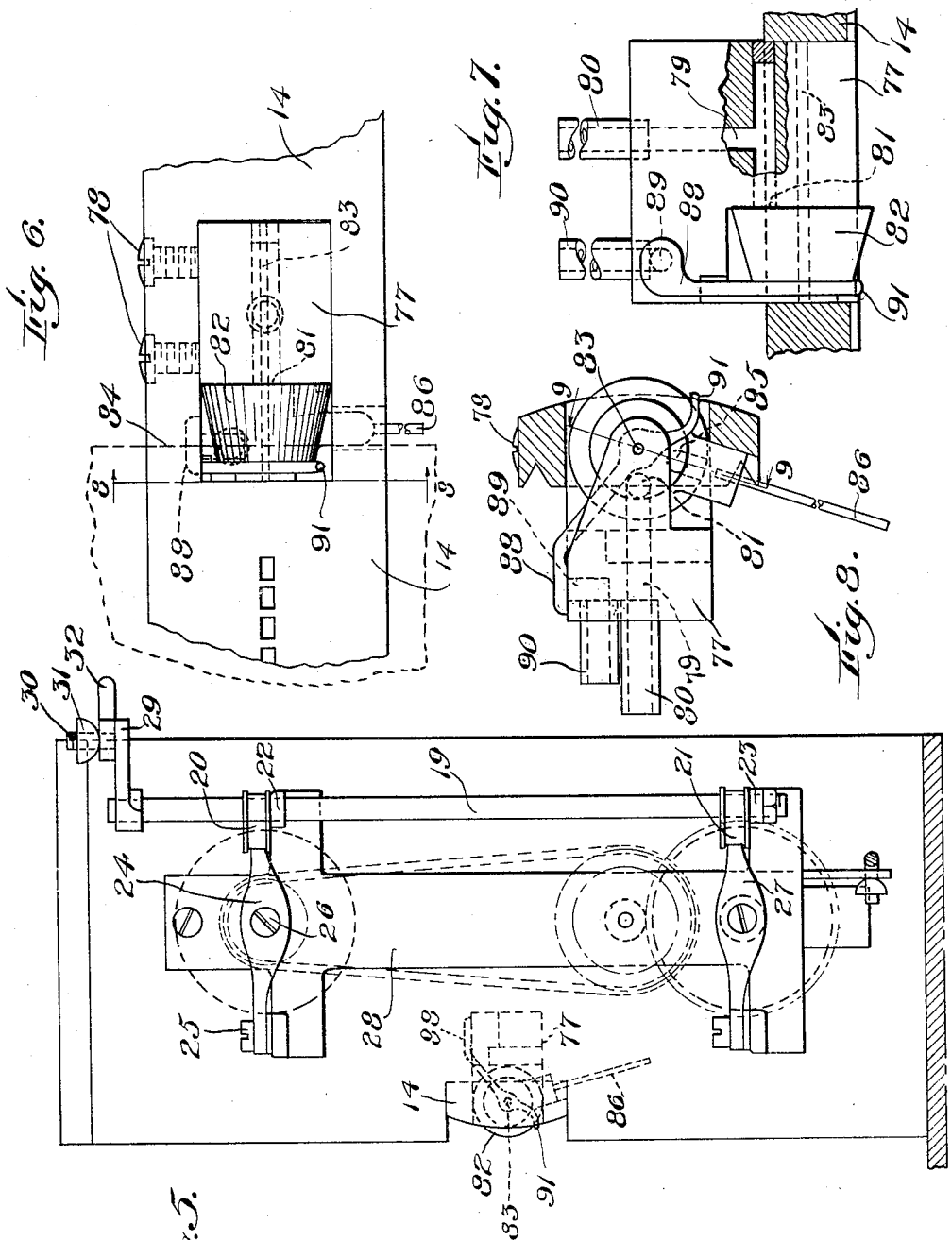

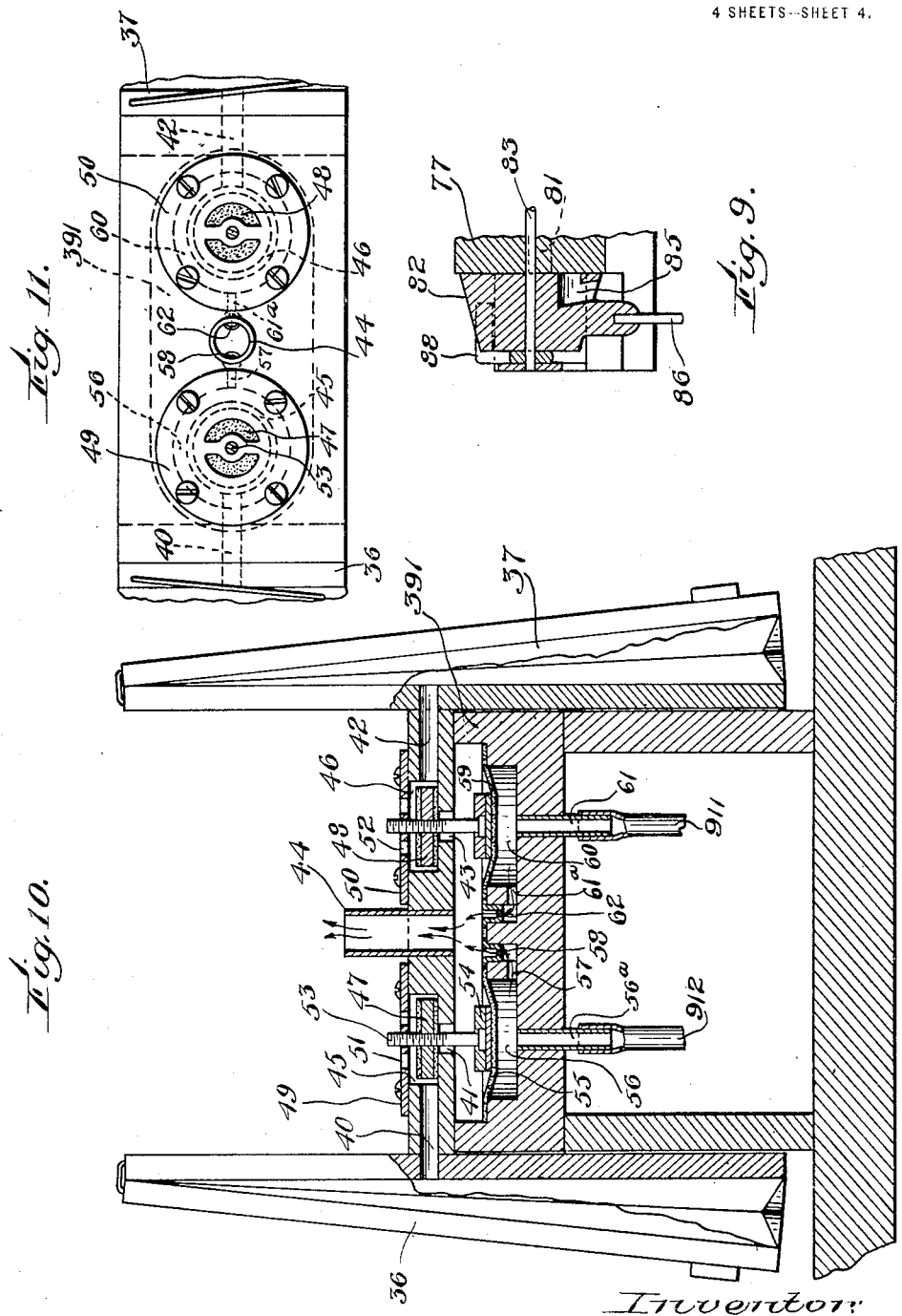

UNITED STATES PATENT OFFICE.

LESTER H. THOMPSON, OF BROOKLYN, NEW YORK, ASSIGNOR OF ONE-HALF TO GEORGE B. CHASE, OF ORONOQUE, CONNECTICUT.

TRACKING DEVICE FOR MUSIC-SHEETS.

1,324,941. Specification of Letters Patent. Patented Dec. 16, 1919.

Application filed November 12, 1917. Serial No. 201,417.

*To all whom it may concern:*

Be it known that I, LESTER H. THOMPSON, a citizen of the United States, residing at Brooklyn, in the county of Kings and State of New York, have invented new and useful Improvements in Tracking Devices for Music-Sheets, of which the following is a specification.

The present invention relates to machines of the sort generally known as automatic player pianos, wherein a perforated note sheet controls the playing action by uncovering slots or holes in a tracker bar, thereby admitting air to actuate the pneumatic mechanisms which, in one manner or another, cause the notes corresponding to the locations of the uncovered holes to be sounded. In designating the class of machines to which the invention relates, as above, I have intended to include all instruments which are controlled and played in the manner above indicated; and for the purpose of this specification, the term "player piano" is to be considered as generic and as including every instrument, of whatever nature or description, which is or may be adapted for operation or control by a perforated sheet in combination with a tracker bar, so called. The term "tracker bar" includes any sort of member having a surface over which the perforated sheet may travel and holes opening in such surface forming the external orifices of conduits leading to the mechanical or pneumatic actions which cause the striking or sounding of various notes on or by the instrument.

In such instruments the perforated sheet is ordinarily rolled upon a spool, which is mounted above the tracker bar, and the sheet is drawn from the spool and across the tracker bar by a draw off roll. In order to perform its duty, the perforations in the sheet must register properly with the holes in the tracker bar; but very frequently in practice the perforations do not thus register and unsatisfactory or intolerable effects result therefrom. It is the purpose of this invention to provide a device adapted automatically to make the perforated sheet run properly and in correct register with the holes in the tracker bar at all times, shifting the sheet to one side or the other in case it should become displaced, by amounts sufficient to correct the displacement. A further part of my object is to accomplish the result above indicated whether the sheet is greater or less than the normal width, and to do so by a means which causes no sensible deterioration of or injury to the paper or to the mechanism itself, and is capable of long continued use without adjustment, inspection, or cleaning. Another part of the object is to provide a means by which the shifting of the paper to its proper path may be accomplished more speedily than heretofore and effected when only the minimum of displacement has taken place, to the end that the paper may run almost perfectly true to the line and without ever shifting from the required path to an objectionable extent.

Having thus set forth the general objects of the invention, I will proceed to describe in detail a mechanism or device embodying specific forms of the invention, and in connection therewith I will explain the underlying principles to which my claim for protection is directed, and point out the special utility and advantage of the same.

In the drawings forming a part of this specification,

Figure 1 is a plan view, with parts broken away and shown in section, of the apparatus hereinbefore referred to.

Fig. 2 is an elevation of the same.

Fig. 3 is a sectional view on line 3—3 of Fig. 1, looking in the direction of the arrows, and representing the parts shown on an enlarged scale.

Fig. 4 is a cross section on line 4—4 of Fig. 3.

Fig. 5 is an elevation of the roll holder, the shifting mechanism, and the controlling valves.

Fig. 6 is an elevation further enlarged of the control valves at the right hand end of the tracker bar.

Fig. 7 is a plan view of the same.

Fig. 8 is a cross section on line 8—8 of Fig. 6.

Fig. 9 is a cross section on line 9—9 of Fig. 8 showing the control valves in detail.

Fig. 10 is a sectional view similar to Fig. 3 showing a modification.

Fig. 11 is a plan view of the modification shown in Fig. 10.

The same reference characters indicate the same parts in all the figures.

Referring first to Figs. 1 and 2, 12 represents the roll box, 13 the spool carrying the rolled up music sheet, 14 the tracker bar, and 15 the draw off roll. These parts may be made, arranged, and operated exactly according to any one of the several methods or combinations already in use involving means for shifting either the spool or the draw off roll endwise in order to cause a proper tracking of the paper. It will be sufficient for an understanding of my invention to assume that the left hand trunnion or support of the spool 13 is mounted in a socket 16 adapted to be displaced endwise against the resistance of a spring 17, and that the right hand end is engaged with a spindle 18 which is adapted to be moved endwise by force externally applied. The draw off roll may be similarly mounted and is so shown in Fig. 2, but such mounting is not usual in instruments of the type referred to and is not essential to the operation of the invention. There is shown at the right hand side of the spool box an upright shaft 19 carrying eccentrics 20 and 21 (Fig. 5) and turning in bearings 22, 23, on which the eccentrics respectively rest. A lever 24 having its fulcrum on a stud 25 extends across the end of the spindle 18 of the spool, and carries an adjustable abutment screw 26 adapted to bear against such spindle, as shown in Fig. 1, the end of said lever being engaged with the eccentric 20. A similar lever 27 is shown in Fig. 5 as similarly engaged with the spindle of the draw off roll and with the eccentric 21. The fulcrums for these levers, and the bearings for the shaft 19 are carried by a plate 28 which is suitably fastened to the end of the spool box. Mounted on a part of the shaft 19 is an arm 29 to which is connected, by means of a pivot pin 30, on which it is confined by a nut 31, a link 32; said link being pivoted to an arm 33 on a rock shaft 34 which carries a second arm 35 and is mounted on the opposite end of the spool box. When the link 32 is moved to the right, the eccentric 20 is turned so as to push the spool 13 to the left; and when the link is moved to the left the eccentric is turned away so that the spring 17 is enabled to shift the spool to the right.

The combination of parts above described is shown simply as an operative means for displacing either the paper spool or the draw off roll, or both, so as to bring the paper into the proper tracking line in case it should have become displaced therefrom, and is not intended as a limitation of the invention to this particular combination. Indeed the specific combination thus far described is not novel and is not my invention, but is one of a number of means heretofore disclosed to effect correct tracking of the paper with respect to the tracker bar. Other devices have also been made known for securing an equivalent result by shifting the tracker bar instead of the roll; and all such devices may be generically described as tracking correction means. The thing which I have invented is the controlling device or mechanism for the tracking correction means, and the same may be associated with any roll-shifting or tracker-bar-shifting means or mechanism. The only claim which I make to such shifting or correcting mechanism is in combination with the novel features of my controlling device.

For operating the roll shifter I provide two pneumatics 36 and 37 to which is connected a rod 38 having a pivotal connection at 39 with the lever 35. These pneumatics, as shown, are of the ordinary bellows type and they are mounted upon the opposite ends of a vacuum wind chest 391 with which the pneumatic 36 communicates by a passage 40 and port 41, and the pneumatic 37 communicates by a similar passage 42 and port 43. Air is exhausted from the chamber within the chest through an outlet 44 which is connected with the motor pneumatic of the machine. The passages 40 and 41 are in the cover of the vacuum chest and open into chambers 45 and 46 respectively in which are located valves 47 and 48. Plates 49 and 50 cover these valve chambers, and are formed with openings 51 and 52, respectively. The valves are adapted to close either the ports to the vacuum chamber or the openings to the outer air.

The valve 47 is adjustable on a stem 53 to which is connected a button or foot 54 resting on a diaphragm 55 which extends over a chamber 56, said chamber and diaphragm constituting a pneumatic for operating the valve. Into this chamber leads an admission tube 56ᵃ and from it opens an outlet port 57 to a leak-off vent 58 which opens into the vacuum chamber in chest 391. Valve 48 is similarly associated with a pneumatic consisting of diaphragm 59 and chamber 60 having an inlet 61 and leak-off outlet vent 62.

A second inlet 63 to the chamber 56 is connected with a conduit 64 which is joined to a tube 65 (Fig. 4) mounted above the vacuum chest and having one end open. A valve 66 is adapted to close and open the orifice of the latter tube and is operated to that effect by a pneumatic consisting of a diaphragm 67 over a chamber 68, to which there is an inlet 69, the stem 70 of valve 66 having a foot 71 which bears on the diaphragm. A leak-off vent 72 permits a limited escape of air from the chamber 68 into the vacuum chamber. Pneumatic chamber 60 likewise has a second inlet 73 connected by a conduit 74 with a tube 75 under the control of a valve like the valve 66, which is operated by a pneumatic like the pneumatic 67, of which the admission tube for air is shown at 76 in Fig. 3.

Attention is now directed to Figs. 6, 7, 8, and 9 for a showing of the valves controlling the pneumatics last described. At each end of the tracker bar 14 is set a block 77, the same being preferably placed in an opening cut in the bar and secured therein by clamp screws 78 threaded through tapped holes in the edge of the bar and bearing against the block. In the block is a passage 79 entering from the rear side thereof from a nipple 80, and terminating in an orifice or port 81 in the side of the block which faces toward the path of the note sheet. Abutting against this surface is a roller valve 82 which is mounted to turn on a pivot pin 83 set into the block 77, and is of such length axially that its farther end projects slightly beyond the nearer edge of the correctly positioned note sheet of normal width. The normal position of such edge is indicated by the broken line 84 in Fig. 6. This roller valve is preferably conical as to its exterior surface and is so placed, by virtue of its form and dimensions, and of the position of the block 77, that its smaller end is in rear of the path of the paper while the outer or forward portion of its surface inclines across the plane of that part of the paper which crosses the holes in the tracker bar, and at its larger end is in front of such plane. That is, the roller valve is so placed that when a note sheet of normal width is correctly positioned, the latter passes over without touching the roller valve, but when the edge of the sheet is shifted ever so slightly from its normal path away from the center of the tracker bar, it makes contact with the surface of the roll, and in its onward travel turns the latter about the axis thereof. In the roller valve is a port 85, shown in Fig. 9, which at one end opens through the side of the valve to the outer air, and at the other end through the face of the valve against the block 77. A weight 86 is attached to the valve and positioned to hold the latter normally with its port 85 out of register with the port 81 in the block, this being the position shown in Fig. 8, but a partial rotation of the valve brings port 85 into register with port 81, and a portion of the block is formed to stop the valve at the point where this register occurs. As the valve in actual construction is small and light, its actual size being much less than that indicated in Figs. 6 to 9, it is easily turned, and the light friction of the paper edge moving over it has more than ample force to turn it from the position shown in the drawings, where it closes the port 81, into the position where it establishes communication from the outer air through such port to the passage 79.

In the arrangement as shown in the drawings the note sheet travels downwardly across the tracker bar, this being the arrangement commonly adopted in automatic player instruments, but the arrangement may be varied and like effects secured by equivalent means in any other arrangement of the parts, as will be at once evident to those skilled in the art.

There are two such blocks 77 and valves 82, as described, in the tracker bar, one being at each end thereof, as indicated in Fig. 2. The one particularly shown in Figs. 6 to 9 is that for the right hand end of the tracker bar, the one at the left hand end being the reversed duplicate of the same.

The nipple 80 at the right hand end of the block 77 is connected with one end of a tube or conduit 911, which leads to the inlet 61 of the pneumatic chamber 60 in the pneumatic controlling device; while the corresponding nipple of the left hand controller is connected to a conduit 912 which leads to the inlet 56ª of the pneumatic chamber 56. By means of these conduits the outer air is allowed to enter the pneumatic chambers 60 and 56 when respectively the right hand or the left hand valve 82 is so turned as to bring its port into register with the passage in the adjacent block. Thereby if the note sheet should run to the right of its proper path, it turns the right hand control valve and allows the outer air to flow into the chamber 60, creating a pressure therein which is greater than that in the vacuum chamber of chest 391, and thus raising the pneumatic diaphragm 59, because the inlet is of greater capacity than the leak-off vent 62. Thereby the valve 48 is shifted to open the port 43 and close the ports 52, thus putting the pneumatic 37 into connection with the vacuum chamber, whereby the air in said pneumatic is exhausted and the pneumatic is collapsed. Thus the connecting rod 38 is moved to the left, rocking the shaft 34 and moving the link 32 to the right, thereby rocking the shaft 19 and turning the eccentric 20 so as to shift the spindle 18 and the spool 13 to the left, bringing the note sheet into the correct position. As soon as this position is reached the valve 82 is released and the inlet port 81 closed, thereby excluding the outer air from the pneumatic chamber 60, wherein the pressure quickly becomes reduced to that in the vacuum chamber by escape through the leak-off vent 62. The valve 48 then closes the port 43 and opens 52; and the parts are restored to their normal position. When the note sheet becomes displaced to the left it opens the left hand control valve 82 whereupon the valve 47 is operated in the same manner as above described to put the pneumatic 36 in connection with the vacuum chamber and thereby move the transmission connections in the opposite direction, swinging the eccentric 20 to the right (with respect to Fig. 1) and allowing the spool 13 to be displaced to the right by its spring pressed left hand pivot. When either pneumatic 36 or 37 is operated as above described, the other is permitted to breathe through the port 52 or the port 51 as the case may be, which enables both to act through the same connecting rod 38.

A further control is provided by an auxiliary valve for sheets of less than normal width, which are so narrow that they may shift badly out of true before they will operate either roller valve 82. This auxiliary valve is shown in Figs. 6 to 8 as a cover 88 arranged to overlie the orifice, in the upper surface of the block 77, of a passage 89 which runs through said block to an external nipple 90. The valve 88 is here shown as carried by an arm which is mounted to turn about the pivot 83 of the roller valve, but it may be otherwise mounted if desired. This valve lever has a second arm terminating in a finger 91 having a rounded edge which projects slightly forward from the surface of the tracker bar slightly inside of the smaller end of the roller valve. By "inside" in this connection I mean between the roller valve and the center of the tracker bar. By reason of the rounded end of the finger the edge of the paper is able to slip across the same from one side without being torn or punctured; and when it overlies such finger, the paper, by its tension, presses the finger back and opens the valve 88, thereby admitting the outer air to the passage 89. Such a valve is provided upon each of the blocks 77. From the nipple 90 of the right hand valve block a conduit 92 leads to the inlet 69 of the pneumatic chamber 68, which is directly in rear of the pneumatic 56 and operates the valve 66 controlling the second entrance to the latter pneumatic as previously described; and from the corresponding nipple of the left hand block 77 a conduit 93 runs to the inlet 76 of the pneumatic corresponding to 68 which similarly controls the second inlet 73 to the pneumatic 60.

The two fingers 91 are intended to be placed so that both will be pressed back at the same time by a sheet of normal or less than normal width which is in the correct tracking position. Thus the valves 88 are both open and the outer air is enabled to enter both pneumatics 68, thereby closing the tubes 65 and 75 by the valves 66 which coöperate therewith, and excluding air from the second inlets 63 and 73 of the pneumatics 56 and 60. With a narrow sheet both roller valves are likewise closed. If now, for example, assuming that the note sheet is of less than normal width, the note sheet should become displaced to the right, the left hand valve 88 is allowed to close, which permits the valve controlling the second inlet 73 of the right hand pneumatic chamber 60 to be opened to the outer air, whereby the pneumatic 37 is operated as already described, moving the connecting rod 38 to the left, the link 32 to the right, and shifting the spool 13 to the left. Correspondingly if the note sheet should be displaced to the left, the right hand auxiliary valve 88 is closed, and the left hand pneumatics 56 and 36 are operated in the reverse order to that last described so as to permit shifting of the spool to the right by its spring pressed left hand trunnion.

The normal width sheet overlies both of the auxiliary valve fingers 91 and keeps both valves 88 continuously open, whereby the auxiliary inlets of both pneumatics 56 and 60 are closed and the latter are controlled exclusively by the roller valves. In some conditions an excessively wide note sheet may be found, which is so wide as to bear on both roller valves at once and hold them both in their opened positions. The effect is then to put both pneumatics 36 and 37 in connection with the vacuum chamber and to operate neither, because of the balancing of each by the other. A shifting effect occurs only when the sheet has become displaced so far as to release one of the roller valves, allowing the same to close, whereupon the valve which remains open causes movement of the pneumatics in the direction which effects a shifting of the note sheet back to its proper path.

The differences between the normal width sheet and the extremely wide sheet, on the one hand, and the extremely narrow sheet on the other, are such as occur through errors in cutting the sheets in the first instance and the different atmospheric conditions of humidity, and are well within the range of control of the valves hereinbefore described. It is possible also to employ the control valves 82 and 88 at one side of the sheet only in conjunction with one another to effect the proper tracking of the sheet. It will be observed that at either end of the tracker bar one of the valves controls the pneumatic 36 and the other the pneumatic 37, and that the valve 82 when opened puts into operation the pneumatic which it controls, while the valve 88 when closed effects a like result with the pneumatic which it in turn controls. In the normal travel of the note sheet in its proper path, the valve 82 remains closed and the valve 88 is held open. Shifting of the sheet in one direction causes it to turn and so open the valve 82, with resultant actuation of the pneumatic control thereby to shift the sheet back to its proper path; while displacement of the sheet in the opposite direction releases the valve 88, allowing the latter to close and thereby causing the other operating pneumatic to shift the sheet back to the proper position. Not only do the two valves at each end of the tracker bar thus coöperate, but they also coöperate with the two valves at the other end of the bar by supplementing the action of the latter. Thus, for example, if the note sheet becomes displaced far enough to turn the roller valve 82 at one side, and to release the cover valve 88 at the other side, then the conjoint operation of these two valves opens both inlets (for instance, the inlets 61 and 73 to the pneumatic 60), with resultant rapid putting of the pneumatic 37 into operation; and correspondingly of the other pneumatic when the sheet becomes displaced in the other direction to that above last assumed.

Another form of the invention which is made without the auxiliary control provided by pneumatics 68 and the valves 88, is shown in Figs. 10 and 11. This construction is identical with that previously described except for the omission of said auxiliary pneumatices and valves, and the parts thereof are designated by the same reference characters already used. It is operated by the roller valves 82 alone. The control valve for the same may, however, be of other types, such as one operable by a finger which may be pushed back by the sheet passing over it, like the finger 92.

Among the advantages possessed by the invention hereinbefore described are the following:

(1) The immediate or direct control exerted by the note sheet is entirely mechanical, as distinguished from the pneumatic control, which is a feature of certain mechanisms heretofore used, accomplished by the edge parts of the sheet in passing over holes or ports in the tracker bar through which, when the sheet has been displaced far enough to uncover one or another of such holes, air is drawn by suction to operate a shifter mechanism. Fibers from the edges of the paper and dust are constantly drawn into such ports by the flowing air, eventually clogging them and the communicating passages, and this is a difficulty which cannot be overcome in the prior construction. By substituting mechanical for pneumatic initiation of control, I avoid this difficulty.

(2) The operation of the control valves is effected by the flat surface of the sheet bearing against, in one case a roller, and in the other case a push button or finger. I wish to emphasize the difference between this form of valve and that which has a control arm or finger crossing the plane of the sheet and operated only by pressure exerted through the edge in the direction of the width of the sheet. In my arrangement the surface of the sheet bears on and operates the valve, and the stress upon the paper in thus operating is solely one of tension, which the paper is well able to withstand. There is no tendency for the paper to be broken or curled up at its edge, because the slant of the roller valve and the bulge of the finger or button 91 are made so gradual, that is, of such a slight angle, that there is no possibility of this effect taking place. That is, the force exerted by the sheet on the valve is not a push exerted through its edge in the plane of the sheet.

(3) As the main control valve is a roller, of which the movement in opening and closing is in the same direction as the travel of the sheet, not the direction of displacement of the sheet, the sheet is enabled to open the valve instantly as soon as it has shifted it far enough to move it at all. That is, the paper need only be displaced far enough to touch the surface of the valve before it fully opens the latter; the lateral shift need not be so great as that required to open a valve by lateral push. In this way a quicker and finer regulation is made possible than is possible in those controlling devices in which the valve is shifted only by the lateral displacement of the paper, or in which a port is covered or uncovered by similar movement of the paper.

(4) The reverse effect, of sudden closing of the valve, occurs as soon as the paper is returned to the proper path. That is, as soon as the paper releases the valve the latter turns by the automatic action of the weight 86, or equivalent actuating means, instantly into the fully closed position.

(5) Each valve unit, including the block 77 with the valve or valves mounted thereon is adjustable into exactly the position required. It may be applied to old instruments in use, simply by cutting openings in the bar at the places where it is required.

(6) After once being placed and adjusted for a particular use the controller requires no further adjustment, being designed and adapted to operate with sheets exhibiting the extreme variations of width in both directions from the normal.

In order conveniently to distingush the varous pneumatics and valves hereinbefore described from one another in the claims, I have applied thereto descriptive designations as follows: The pneumatics 36 and 37 are called the "primary pneumatics" or the "operating pneumatics." The pneumatics comprising respectively the chamber 56 and diaphragm 55, and the chamber 60 and diaphragm 59, are called the "secondary pneumatics" or "control pneumatics." The pneumatics comprising the chambers 68 and diaphragms 67 are called the "tertiary" or "auxiliary" control pneumatics. The valves 47 and 48 which govern the primary pneumatics I call the "operating valves;" and the valves 66 which govern the second admission inlets to the secondary pneumatics I call the "inlet valves." The valves 82 and 88 are called "control valves," and as these valves are both control valves, the former is called the "main control valve" or "control valve" simply, and also a "roller valve;" while the latter is called the "auxiliary control valve" or simply "auxiliary valve." In considering the valves, each roller valve 82 is properly to be considered as the ultimate control valve for one of the operating pneumatics, controlling the same indirectly through the corresponding secondary pneumatic and operating valve, which in this aspect may be called an "intermediate valve." And in a similar sense the valve 88 is the ultimate control valve for the operating pneumatic under certain conditions, controlling the pneumatic through a series of instrumentalities including the tertiary and secondary pneumatics and the intermediate valves respectively operated thereby. Those aspects of the invention which are concerned with the characteristics of the control valves are not necessarily limited to the intermediation of a series of secondary pneumatics and valves, wherefore I claim as my invention the control valves with their novel characteristics in any combination with the operating pneumatic in which they may be associated, and either singly or in joint association. And I thus claim the control valves, while also maintaining my claim to the combination of secondary and tertiary pneumatics and valves with the operating pneumatic and the control valve or valves. Each train of elements comprising the control valve or valves at one end of the tracker bar and the pneumatics associated therewith constitutes a complete combination, a functionally independent unit, which I claim as such without limitation to the fact that there are two such unit combinations in the device as here illustrated. The term "pneumatic" used as a substantive includes any sort of motor acting by or under pneumatic pressure, and is not intended to limit the invention to motors of the bellows or the diaphragm type. The latter I have illustrated in connection with this specification because experience up to the present time has shown them to be best adapted for operation by the comparatively light pressures used in these sorts of instrument, for which reason they are at present preferred. The two operating pneumatics, 36 and 37, make a combined motor capable of exerting force alternately in opposite directions so as to shift the sheet to one side or the other according as the requirements of perfect tracking demand. These terms are thus applied for the purpose of the present specification and for internal differentiation only, and without any limiting intent whatever.

I do not limit the invention to the particular construction of the pneumatics or valves here shown, or to the relative arrangement of the same and of other parts of the mechanism, otherwise than as is required by the express terms of the following claims. Numerous modifications in form, construction, and arrangement may be made within the scope of the invention and the protection of my claims. Within the protection claimed for the valve 88 are included all sorts of valves capable of being operated by a push pin, button, or finger arranged to be pressed upon by the surface of the note sheet. Neither do I restrict the use of the devices in which my invention particularly consists to a combination in which the tracking of the sheet is effected by shifting the sheet itself; for these devices are equally well adapted for use with instruments of the well known type having shiftable tracker bars. Instruments of such type are shown in the patents to L. B. Doman 939,897 granted November 9, 1909, and W. M. Stone 1,105,046 granted July 28, 1914, to which I refer by way of illustration. The association of my novel tracker device with instruments of this type is within the scope of my invention and is not excluded from my claim for protection by reason of the illustration of the invention in combination with a roll shifting mechanism.

What I claim and desire to secure by Letters Patent is:—

1. In a note sheet tracking device for automatic player instruments, the combination with shifter means of an operating pneumatic for actuating said shifter means, a secondary pneumatic, a valve operated thereby governing said operating pneumatic, and a control valve for said secondary pneumatic arranged with a part movable in the direction of travel of the sheet and in a position to be engaged by the note sheet when the latter is displaced from its proper path and to be operated by the frictional drag exerted by the traveling sheet.

2. In a note sheet tracking device for automatic player instruments, an operating pneumatic, and an ultimate control valve for said pneumatic rotatably mounted and having a sheet-engaging surface arranged adjacent to an edge of the note sheet and in position to be pressed upon by the surface of such sheet contiguous to said edge when the sheet is displaced from its proper path, whereby the frictional drag of the sheet upon the said valve surface is enabled to turn the valve.

3. In a note sheet tracking device for automatic player instruments, the combination of an operating pneumatic and an ultimate control valve for the same arranged with a surface operatively movable in the direction of travel of the sheet adjacent to the proper path of the edge of the note sheet in position to be engaged by the surface thereof when the sheet is displaced from such path.

4. In a note sheet tracking device for automatic player instruments, the combination of an operating pneumatic and an ultimate control valve for the same arranged with a surface adjacent to the proper path of the edge of the note sheet in position to be engaged by the surface of the latter when displaced from such path, said surface being movable in the same direction as the travel of the sheet, and being so moved by the drag of the latter into the position wherein it causes said pneumatic to become operative.

5. In a note sheet tracking device for automatic player instruments, a control valve rotatably mounted beside the normal path of one edge of such sheet, and having a surface on which the surface of the sheet contiguous to an edge thereof is adapted to bear when the sheet is displaced from such path, whereby to rotate the valve.

6. In a note sheet tracking device for automatic player instruments, the combination with a tracker bar over which the sheet is adapted to pass, of a roller valve mounted rotatably on an axis transverse to the line of travel of the sheet and located with its circumferential surface protruding from the surface of the tracker bar near one edge of the sheet in position to be overlapped by such edge and engaged by the sheet when the latter is displaced from its proper path, said valve having a port open to the outer air, and a conduit terminating in an orifice over which the valve lies, and into registry with which said port is brought by turning of the valve.

7. In a self-playing musical instrument a tracker bar over which a perforated note sheet is adapted to travel in a given path with reference to the tracker bar, a valve mounted in a position wherein an operating part protrudes from the bar adjacent to the path of an edge of such sheet in position and adapted to be overlapped, pressed upon, and moved in the direction of travel of the sheet, by the surface of the sheet when the latter is displaced from said path, and pneumatic mechanism under control of said valve operable in consequence of such movement of the valve to effect a relative movement between the sheet and tracker bar laterally of said path.

8. In an automatic musical instrument playing machine, a tracker bar, means for leading a perforated note sheet across the face of said tracker bar, a pneumatic motor mechanism for effecting relative movement between said sheet and bar transversely of the direction of travel of the sheet to maintain said sheet in a given path relative to the bar, and two valves mounted adjacent to an edge of the sheet upon which the surface of the sheet is adapted to bear, said sheet then holding the valves in certain positions, one of the valves being thus engaged by the sheet when the latter is displaced out of its path in one direction, and the other being so engaged at all times except when the sheet is displaced from said path in the opposite direction, each valve controlling the operation of said motor mechanism.

9. In an automatic musical instrument playing machine, a tracker bar, means for leading a perforated note sheet across the face of said tracker bar, a pneumatic motor mechanism for effecting relative movement between said sheet and bar transversely of the direction of travel of the sheet to maintain said sheet in a given path relative to the bar, and two valves mounted adjacent to an edge of the sheet upon which the surface of the sheet is adapted to bear, said sheet then holding the valves in certain positions, one of the valves being thus engaged by the sheet when the latter is displaced out of its path in one direction, and the other being so engaged at all times except when the sheet is displaced from said path in the opposite direction, the former of said valves controlling said motor mechanism when engaged by the sheet and then causing said mechanism to effect relative movement between the sheet and tracker bar in one direction, and the latter valve controlling the motor mechanism when released by the sheet to effect such relative movement in the opposite direction.

10. A note sheet tracking device comprising a pneumatic motor operable to apply power in relatively opposite directions, a tracker bar, means for leading a perforated note sheet across the face of said tracker bar, two valves located adjacent to the path of one edge of the sheet and constructed to be overlapped by such edge and pressed upon by the surface of the sheet adjacent thereto, said sheet being normally thus engaged with one of the valves at all times except when shifted in one direction from its proper path, and being engaged with the other valve only when shifted in the opposite direction from said path, each valve being open when thus engaged by the sheet and closed when disengaged therefrom, and each valve when in its opened condition causing the combined motor to apply force in the opposite direction to that in which it is caused to apply force by the open condition of the other valve.

11. In a note sheet tracking device for musical instruments, the combination with a tracker bar across the face of which a note sheet is adapted to pass, of control valves, one of which is a roller having a part of its circumference protruding from said face, and the other of which has an operating finger similarly protruding at one end, adapted to be engaged and pressed upon by the surface of such sheet, and a motor controlled by said valves for causing proper tracking of the sheet.

12. In a note sheet tracking device the combination with a tracker bar of a valve block set into said bar having a passage through the same opening into a face of the block which is turned toward the center of the bar, a roller mounted to turn against said face and having a port one end of which opens to the outer air and the other end of which is in a face of the roller next to the said face of the block and is adapted to be placed by turning of the roller in registry with the opening to said passage, the roller being so poised as normally to rest with its port out of registry with the passage, and being so placed that one side of its circumference protrudes from the face of the tracker bar over which the note sheet passes near the normal path of one edge of said sheet, whereby the latter is adapted to pass over and bear on the roller, and thereby turn the same.

13. In a note sheet tracking device the combination with a tracker bar of a valve block set into said bar having a passage through the same opening into a face of the block which is turned toward the center of the bar, a roller mounted to turn against said face and having a port, one end of which opens to the outer air and the other end of which is in a face of the roller next to the said face of the block and is adapted to be placed by turning of the roller in registry with the opening to said passage, the roller being so poised as normally to rest with its port out of registry with the passage, and being so placed that one side of its circumference protrudes from the face of the tracker bar over which the note sheet passes near the normal path of one edge of said sheet, whereby the latter is adapted to pass over and bear on the roller, and thereby turn the same, and a stop for arresting said roller at the point in its turning movement where its port registers with said passage.

14. In a note sheet tracking device, the combination with means for supporting and propelling a note sheet, a tracker bar, of means for effecting correct tracking of such sheet by causing relative lateral movement between the sheet and the bar, comprising an operating pneumatic, a vacuum chamber, a valve operable to put said pneumatic in communication either with said vacuum chamber or with the outer air, a secondary pneumatic for operating said valve, and a control valve for admitting and excluding the outer air respectively to and from said secondary pneumatic, said control valve being arranged relatively to the path in which such note sheet travels to be engaged with such sheet and operatively moved by and with the sheet when the latter has been displaced from its proper path.

15. In a note sheet tracking device the combination with an operating pneumatic, of a chest wherein the internal pressure is different from atmospheric, a valve operable to put such pneumatic in communication either with the interior of said chest or with the outer air, a pneumatic for operating said valve, having a vent connection with the interior of said chest and a valve operable by the note sheet for opening and closing communication between said secondary pneumatic and the outer air.

16. In a note sheet tracking device the combination with an operating pneumatic, of a chest wherein the internal pressure is different from atmospheric, a valve operable to put said pneumatic in communication either with the interior of said chest or with the outer air, a pneumatic for operating said valve, having a vent connection with the interior of said chest, a second valve for opening and closing communication between said secondary pneumatic and the outer air, a tertiary pneumatic operating said second valve, said tertiary pneumatic also having connection with the interior of said chest, and a control valve operable by the note sheet for opening and closing communication between said tertiary pneumatic and the outer air.

17. An apparatus as set forth in claim 16 distinguished by the fact that said control valve is arranged to be engaged and pressed upon by the surface of the note sheet and to be released therefrom, whereby the control valve is operated.

18. A note sheet tracking apparatus comprising an operating pneumatic, a chest having internal pressure different from atmospheric, a valve for putting said pneumatic in connection exclusively with said chest or with the outer air, a secondary pneumatic having a vent connection with said chest and having two connections with the outer air, a valve controlling one of said outer connections operable by a note sheet, an intermediate valve controlling the other of said outer connections, a tertiary pneumatic for operating said intermediate valve, and having a vent connection with said chest and an opening to the outer air, and a valve operable by the note sheet for controlling the last named connection.

19. An apparatus as set forth in claim 18 distinguished by the fact that both control valves therein specified are arranged to be engaged and actuated by the surface of the note sheet.

20. In a tracking device for perforated note sheets, the combination with a tracker bar over which such sheet is adapted to pass, of a valve block mounted adjustably in said bar to be movable toward and away from the center of the bar, means for securing the block in its adjustments, a roller valve pivoted on said block having a part of its surface protruding from the face of the tracker bar at an inclination thereto adjacent to the path of an edge of the note sheet to be engaged by the surface of the note sheet when passing thereover, and thereby moved and a port in the valve block arranged to be opened and closed by movement of said valve in respectively opposite directions.

21. In a tracking device for perforated note sheets, the combination with a tracker bar over which such sheet is adapted to pass, of a valve block mounted adjustably in said bar to be movable toward and away from the center of the bar, means for securing the block in its adjustments, a valve pivoted on said block having a portion protruding from the face of the tracker bar adjacent to the path of an edge of the note sheet to be engaged and pressed upon by the surface of the note sheet when passing thereover, and a port in the valve block arranged to be opened and closed by movement of said valve in respectively opposite directions, said valve tending normally to close, and being opened by engagement of the sheet therewith.

In testimony whereof I have affixed my signature.

LESTER H. THOMPSON.